United States Patent [19]
Hsiung et al.

[11] Patent Number: 5,993,760
[45] Date of Patent: *Nov. 30, 1999

[54] BULK NITROGEN PURIFICATION PROCESS THAT REQUIRES NO HYDROGEN IN THE REGENERATION

[75] Inventors: Thomas Hsiao-Ling Hsiung, Emmaus; John Bruce Wallace, Jr., Red Hill, both of Pa.

[73] Assignee: Air Products and Chemicals, Inc., Allentown, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/880,907

[22] Filed: Jun. 23, 1997

[51] Int. Cl.⁶ ...................................................... B01D 53/34
[52] U.S. Cl. .......................... 423/210; 423/219; 423/225; 423/230; 423/247; 423/248
[58] Field of Search ..................................... 423/219, 210, 423/247, 248, 225, 230; 95/138

[56] References Cited

U.S. PATENT DOCUMENTS

| | | | |
|---|---|---|---|
| 4,579,723 | 4/1986 | Weltmer et al. | 423/219 |
| 4,713,224 | 12/1987 | Tamhankar et al. | 423/219 |
| 4,869,883 | 9/1989 | Thorogood et al. | 423/219 |
| 5,536,302 | 7/1996 | Golden et al. | 95/138 |

*Primary Examiner*—Steven P. Griffin
*Assistant Examiner*—Stuart L. Hendrickson
*Attorney, Agent, or Firm*—Geoffrey L. Chase

[57] ABSTRACT

A process for removing parts-per-million quantities of unwanted species such as oxygen, carbon monoxide, hydrogen, carbon dioxide and water from a cryogenically produced nitrogen gas stream using an oxygen removal step prior to a nickel-based catalytic adsorption step in order to eliminate the need for hydrogen regeneration in either step. Ultrapure nitrogen heated to less than 500° C. is used to purge and hold the beds used for unwanted species removal, eliminating the need for hydrogen regeneration thus reducing the regeneration cycle time and cost.

7 Claims, No Drawings

BULK NITROGEN PURIFICATION PROCESS THAT REQUIRES NO HYDROGEN IN THE REGENERATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention pertains to removing trace impurities from cryogenically produced nitrogen by adsorption in beds that can be regenerated without using hydrogen or other reducing gases.

Ultra-high purity (UHP) nitrogen (99.9999% by volume nitrogen) gas is used as an inerting medium during the various processing steps involved in the manufacture of semi-conductor devices, and in particular advanced semi-conductor devices with very small feature sizes, high device density and larger chip sizes. Large semi-conductor fabrication houses (FABS) can require in excess of one hundred thousand standard cubic feet per hour (SCFH) of UHP nitrogen. The UHP nitrogen is produced by separating the nitrogen from atmospheric air using well-known cryogenic technology. The cryogenically separated nitrogen is then further treated to remove trace quantities of hydrogen, carbon monoxide and oxygen. Traces of carbon dioxide and water will also be removed if they are present in the feed stream. Several of the well-known techniques for removing these unwanted species (i.e. hydrogen, carbon monoxide, oxygen, carbon dioxide and water) from cryogenically produced nitrogen gas are discussed in the specification of U.S. Pat. No. 4,869,883 which is incorporated herein by reference.

The '883 patent discloses a three-step purification method for bulk nitrogen. In the first step a copper-based catalyst, in reduced form, is used to remove oxygen by promoting the reaction of oxygen with carbon monoxide and hydrogen to form carbon dioxide and water vapor. The copper-catalyst is maintained in a continuously reduced state by the presence of excess reducing gas in the impurities in the inert gas. In a second step a copper oxide containing bed is used to promote the conversion of residual amounts of carbon monoxide and hydrogen to carbon dioxide and water by reaction with the oxygen component of the copper oxide catalyst. The third step employs a conventional molecular sieve bed to remove carbon dioxide and water. The three step process, according to patentees, requires no additional hydrogen to regenerate the reduced copper catalyst in the first step. However, the second step requires periodic regeneration with an oxygen containing stream.

One of the most effective methods for removing unwanted species is effected by passing the cryogenically generated nitrogen gas through a bed of nickel-based catalytic adsorbent such as described in U.S. Pat. No. 4,713,324. The known adsorbents can remove parts-per-million by volume (ppm) levels of oxygen, carbon monoxide, hydrogen, carbon dioxide and water from the cryogenically produced nitrogen to levels that are below part-per-billion by volume (ppb). The capability of the adsorbent decreases with time-on-stream or time-in-use. In order to return the nickel-based catalytic adsorbent to its most productive state the adsorbent must be periodically regenerated. In order to do this it is conventional to use hydrogen diluted with nitrogen to reactivate the adsorbent when the capacity of the adsorbent to remove unwanted species has reached a predetermined maximum cycle time. After the hydrogen reduction step, which removes the unwanted species adsorbed onto the catalytic adsorbent, a purge step is necessary to remove the residual hydrogen from the adsorbent bed. Utilizing hydrogen reduction followed by purging creates an inefficiency in production of UHP nitrogen because of the time required to purge the bed of residual hydrogen. In addition, the cost of operating such regeneration schemes on a continuing basis are significant. This problem has been somewhat ameliorated by the method disclosed in our co-pending application referred to below. However, elimination of a hydrogen purge altogether would be most welcomed in the process of producing UHP nitrogen.

U.S. Pat. No. 5,536,302 discloses an adsorbent for removing trace quantities of oxygen from inert gases, e.g. nitrogen, by use of a porous reducing support such as activated carbon, carbon black, coal, petroleum coke and titania impregnated with an alkali metal oxide or an alkaline earth metal oxide formed in-situ.

In our co-pending application Ser. No. 08/728,118 filed Oct. 10, 1996 now U.S. Pat. No. 5,863,852 we have disclosed a method of regenerating a nickel-based catalytic adsorbent bed which is used to remove parts-per-million (ppm) quantities of unwanted species from cryogenically produced nitrogen wherein the number of hydrogen regeneration steps for the bed can be reduced, but not eliminated.

BRIEF SUMMARY OF THE INVENTION

The present invention in its broadest aspect pertains to a process for removing parts-per-million quantities of unwanted species such as oxygen, carbon monoxide, hydrogen, carbon dioxide and water from a cryogenically produced nitrogen gas stream, by first passing nitrogen gas stream through a first separation phase to remove oxygen from the stream by a technique that includes gettering, catalytic conversion, and adsorption, and thereafter passing the stream through a nickel-based catalytic adsorbent bed of the type that will remove carbon dioxide, carbon monoxide, hydrogen and water from the stream, the process being further characterized in that the first and second steps can be regenerated without using hydrogen or another reducing gas, thus reducing the regeneration cycle time and the overall cost of regeneration. Furthermore, depending upon the oxygen removal technique selected, the first and second steps can be carried out in a single vessel using beds that, in order, remove the oxygen and then the other unwanted species from the cryogenically produced nitrogen gas.

Another aspect of the invention involves eliminating the use of hydrogen to regenerate a nickel-based catalytic adsorbent used to remove unwanted species from a cryogenically produced nitrogen gas by, prior to passing the nitrogen gas stream through the nickel-base catalytic adsorbent, passing the gas stream through an oxygen removal step, thus yielding a nitrogen gas having a purity of at least 99.9999% nitrogen.

According to the invention the incorporation of the oxygen removal step prior to the catalytic nickel adsorption step results in a process using only UHP nitrogen heated to a temperature of less than 500° C. to regenerate the beds without requiring a reducing step and the use of a reducing gas.

BRIEF DESCRIPTION OF THE SEVERAL VIEWS OF THE DRAWINGS

Not applicable

DETAILED DESCRIPTION OF THE INVENTION

In order to produce UHP nitrogen gas, producers conventionally start with cryogenically produced nitrogen, which normally contains part-per-million by volume levels of oxygen, carbon monoxide, hydrogen, carbon dioxide and water (hereinafter referred to as the unwanted species) in the nitrogen gas. The unwanted species can be effectively removed or reduced to below parts-per-billion by volume levels by passing the cryogenically produced nitrogen through bed of a nickel-based catalytic adsorbent. The nickel-based catalytic adsorbent has the least capacity for carbon dioxide and normally the highest capacity for oxygen. During a normal purification cycle, the carbon dioxide is usually the first species to break out of nickel-based purifier bed. According to current practice, as soon as the carbon dioxide break through occurs, the adsorbent bed is taken off-stream and is regenerated using a reducing gas such as a dilute (1 to 2%) by volume hydrogen-nitrogen mixture. The use of the hydrogen-nitrogen mixture requires a nitrogen purge after the unwanted species are adsorbed or removed from nickel-based catalytic adsorbent. Purging results in a long time interval before the catalytic bed can be put back into service because of the residual hydrogen from the regeneration step. The long purge also increases the cost for producing UHP nitrogen by this method.

As disclosed in our co-pending application, referred to above, the number of hydrogen regeneration steps can be reduced but not eliminated to further increase the efficiency of the catalytic adsorbent process.

According to the present invention a more cost effective method of purifying bulk gases such as nitrogen without the need for a reducing gases such as hydrogen has been discovered.

According to the present invention a bed of oxygen scavenging material is placed up-stream of a conventional nickel-catalyst adsorbent bed. The first bed removes oxygen while the second bed, usually a nickel-alumina catalyst bed, removes carbon monoxide and hydrogen, and any residual carbon dioxide and water vapor. The beds can be arranged in one vessel or they can be placed in two separate vessels, however, the one vessel arrangement is usually preferred because it cost less to build and operate a single vessel.

In the one-vessel arrangement, the oxygen scavenging material is selected to remove trace amounts of oxygen under conditions that would result in removal of the oxygen in the catalytic-nickel bed. This usually means operating at ambient temperature and pressures in the range of from 5 to 10 atmospheres. The material selected for oxygen scavenging should not promote the reaction of carbon monoxide and oxygen to produce CO2. In addition the oxygen scavenging material should be regenerated using only hot nitrogen purge without adding reducing gases such as hydrogen. An acceptable material for the oxygen scavenging is available from Air Products and Chemicals Inc. Allentown, Pa. These compositions are further described in U.S. Pat. No. 5,536,302, the specification of which is incorporated herein by reference.

Employment of two-vessels according to the present invention permits the user to have more flexible operating conditions. In a two-vessel system oxygen can be removed using any separation method including chemical reaction and adsorption. The compositions disclosed in the above '302 patent can also be used in a two-vessel system where the vessels are placed in series.

In the embodiment of the present invention where a single vessel is used, once the detection of carbon dioxide break through occurs in the nickel-catalyst bed, the purification vessel is taken out of service and subjected to a process wherein nitrogen, heated to a temperature of between 100° C. (212° F.) and 500° C. (932° F.), is passed through the oxygen removal bed and the nickel catalyst bed to the remove adsorbed species. The nitrogen used for regeneration is UHP nitrogen, (i.e. 99.9999% by volume nitrogen). Following removal of the adsorbed species the beds can be cooled to ambient temperature under an atmosphere of UHP nitrogen and held under UHP nitrogen until the vessel is put back into service. Conventional purification plants usually have two or more purification vessels which are used alternately so that one is being regenerated while the other is being used to purify the nitrogen gas. Where there are more than two vessels, e.g. a third vessel is in a standby or ready to use mode, while one vessel is on stream and the other vessel is being regenerated.

The present invention can be illustrated by the following examples.

EXAMPLE 1

An activated carbon support impregnated with an alkali metal oxide was prepared in accord with the methods outlined in the '302 patent. This material was placed in a laboratory vessel which was heated under a flow of nitrogen at 600° F. (316° C.). The material in the bed was challenged with 3.5 ppm oxygen, 2.5 ppm carbon monoxide and 1 ppm hydrogen and nitrogen. The effluent from the bed revealed oxygen was completely removed without forming carbon dioxide while the carbon monoxide and hydrogen were essentially unchanged flowing through the bed. After a fixed amount of time, trace amounts of oxygen in the effluent indicated the bed had to be regenerated. Regeneration was achieved by purging the bed with hot nitrogen gas at 300° C. (572° F.). There was no need to add hydrogen during the regeneration phase.

EXAMPLE 2

A bed of nickel-based catalytic adsorbent was challenged with 2.5 ppm carbon monoxide and 1 ppm hydrogen in a nitrogen carrier gas. The feed simulated the impurity challenge in Example 1, assuming that the oxygen was removed by the bed in Example 1. The effluent was monitored for the presence of carbon dioxide, carbon monoxide and hydrogen. Surprisingly the break through time for the first impurity to appear in the effluent was increased 5-fold in comparison with the case when there is oxygen present in the feed to the nickel-based catalytic adsorbent bed. Without oxygen in the feed, no carbon dioxide was observed in the effluent and the first impurity to break through would either be carbon monoxide or hydrogen, the breakthrough species being determined by the height of the nickel-catalyst bed. This is entirely different from the conventional process where oxygen is in the feed gas. Where oxygen is present in the feed gas the first impurity to break through was carbon dioxide which is a reaction product of the carbon monoxide and oxygen.

EXAMPLE 3

The nickel-catalyst bed used in Example 2 was subjected to a flow of hot nitrogen gas at 205° C. (400° F.) to purge out retained carbon monoxide and hydrogen. No hydrogen was added to the pure nitrogen used as the purge stream. The purge stream was monitored for carbon monoxide and hydrogen using a gas chromatograph. When concentrations of carbon monoxide and hydrogen in the purge effluent dropped below an acceptable level, the nickel-bed was again challenged with similar levels of carbon monoxide and hydrogen. The break through time of the impurities, after regeneration, was almost identical to those observed in Example 2, indicating the nickel-catalytic bed could be regenerated without the use of hydrogen.

Thus, according to the present invention the purification of bulk nitrogen can be achieved using two beds arranged in series, the beds containing different purification materials. The first bed contains an oxygen scavenging material that removes trace quantities of oxygen from the nitrogen stream without permitting reaction of oxygen with carbon monoxide and hydrogen. The second bed is the nickel-based catalytic material that removes trace quantities of carbon monoxide and hydrogen. Removing oxygen from the nitrogen feed enables the nickel-catalyst bed to be regenerated using only a hot nitrogen purge. No reducing gas such as hydrogen is required to regenerate either bed. In addition, the nickel-catalyst bed becomes more effective in purifying nitrogen when oxygen is not present in the feed and thus a smaller bed is required. The arrangement according to the present invention differs from the conventional bulk nitrogen purification process where only a nickel-catalyst bed is used.

In addition to reducing the size of the nickel-catalyst bed the present invention improves the overall process by reducing the total regeneration time. Normally for a conventional nickel-catalyst bed, the regeneration procedure requires four steps. For a one-week operating cycle, the following 150-hour regeneration procedure is typical.

| Steps | Time Duration, Hours |
| --- | --- |
| 1. Heat up reduction (reduction plan with H2 containing gas) | 4 |
| 2. Reduction | 24 |
| 3. Hot Purge | 110 |
| 4. Cooling | 12 |
| | Total hours = 150 |

During the entire regeneration process a flow of high purity nitrogen (99.9999% by volume nitrogen) gas at a rate of 4 to 8 percent of the treated gas flow rate is normally required. The hot purge step is required to purge out residual hydrogen from the catalyst bed used in the reduction step.

Thus, by using the layer of oxygen scavenging material up stream of a conventional nickel-catalyst bed according to the present invention a different regeneration procedure is achieved. Since no hydrogen is needed to regenerate or rejuvenate the material in the purifier, the reduction step is eliminated. In addition, the hot purge step can be significantly shortened, because there is no need to purge out hydrogen.

An improved generation procedure would be as follows:

| Steps | Time Duration, Hours |
| --- | --- |
| 1. Heat up | 4 |
| 2. Hot Purge (no H2) | 56 |
| 3. Cooling | 12 |
| | Total hours = 72 |

From the foregoing it is apparent that the process according to the present invention eliminates the need for hydrogen and the quantity of UHP nitrogen used in regeneration is significantly reduced.

The present invention has been discussed and illustrated in relation to the production of ultra-pure nitrogen. However, any gas purification process that uses similar catalytic adsorbent techniques, can use the process of the present invention with similar results. For example, similar purifiers are used in the production of ultra-high purity argon and helium so, the process of the present invention is applicable to these gases also.

Having thus described our invention, what is desired to be secured by letters patent of the United States is set forth in the appended claims.

We claim:

1. A process for removing parts-per-million quantities of unwanted species selected from the group consisting of oxygen, carbon monoxide, hydrogen, carbon dioxide, water and mixtures thereof from a cryogenically produced nitrogen gas stream comprising:

a first step of passing said nitrogen gas stream through a first separation phase to remove oxygen from said nitrogen gas stream by a technique selected from the group consisting of a gettering, chemical reaction and adsorption without converting said oxygen to carbon dioxide;

a second step of passing said nitrogen gas stream through a nickel-based catalytic adsorbent bed sufficient to remove carbon dioxide, carbon monoxide, hydrogen and water from said nitrogen gas stream, said process further characterized by said first and second steps being capable of regeneration without hydrogen reduction; and periodically regenerating said first separation phase and said nickel-based catalytic adsorbent bed with a flow of only a nitrogen purge stream at a temperature of approximately 100° C. to 500° C.

2. A process for eliminating the use of hydrogen to regenerate a nickel-based catalytic adsorbent for removal of unwanted species selected from the group consisting of oxygen, carbon monoxide, hydrogen, carbon dioxide, water and mixtures thereof from a cryogenically produced nitrogen gas stream comprising the steps of:

prior to passing said nitrogen gas stream through said nickel-based catalytic adsorbent, passing said stream through an oxygen removal step said oxygen removal step being one of gettering, adsorption, or chemical reaction adsorption without converting said oxygen to carbon dioxide capable of regeneration without hydrogen, whereby said nickel-based catalytic adsorbent is regenerated with only a nitrogen purge at a temperature of approximately 100° C. to 500° C. using nitrogen having a purity of at least 99.9999% by volume.

3. A process according to claim 2 wherein said oxygen removal step is performed by passing said nitrogen gas stream through an adsorbent bed consisting essentially of a porous support impregnated with an alkali metal oxide.

4. A process according to claim 2 wherein said nitrogen gas stream is passed through an alumina supported nickel adsorbent bed after said oxygen removal step.

5. A process according to claim 3 including the step of regenerating said nickel-based catalytic adsorbent and said porous support impregnated with an alkali metal oxide adsorbent by flowing nitrogen having a purity of at least 99.9999% by volume $N_2$ through said bed while maintaining said bed at a temperature of a least about 200° C. for a period of time sufficient to remove said adsorbed species from said beds.

6. A process according to claim 5 including the steps of cooling said beds to ambient temperature and holding said beds under an atmosphere of 99.9999% by volume pure nitrogen.

7. A process for removing parts-per-million quantities of unwanted species selected from the group consisting of oxygen, carbon monoxide, hydrogen, carbon dioxide, water and mixtures thereof from a cryogenically produced nitrogen gas stream comprising:

a first step of passing said nitrogen gas stream through a bed of a catalytic adsorbent being a porous support impregnated with an alkali metal oxide to remove oxygen from said nitrogen gas stream without converting said oxygen to carbon dioxide;

a second step of passing said nitrogen gas stream through a nickel-based catalytic adsorbent bed sufficient to remove carbon dioxide, carbon monoxide, hydrogen and water from said nitrogen gas stream, said process further characterized by said first and second steps being capable of regeneration without hydrogen reduction; and periodically regenerating said first step bed of a catalytic adsorbent and said second step nickel-based catalytic adsorbent bed with a flow of only a nitrogen purge stream at a temperature of approximately 100° C. to 500° C.

* * * * *